United States Patent [19]

Adams et al.

[11] Patent Number: 5,039,896
[45] Date of Patent: Aug. 13, 1991

[54] MAIN FIELD COIL CONNECTOR WITH HIGH CYCLIC DUTY CAPABILITY

[75] Inventors: Steven L. Adams, Clifton Park; William L. Bird, Scotia; Humphrey W. Chow, Schenectady; Kirk G. O'Brien, Broadalbin; Paul C. Rasmussen, Schaghticoke, all of N.Y.

[73] Assignee: General Electric Company, Schenectady, N.Y.

[21] Appl. No.: 453,309

[22] Filed: Dec. 20, 1989

[51] Int. Cl.[5] ............................................. H02K 11/00
[52] U.S. Cl. ...................................... 310/71; 310/180; 310/198; 310/208; 310/261
[58] Field of Search .................. 310/71, 42, 165, 179, 310/180, 184, 195, 198, 208, 261; 439/862

[56] References Cited

U.S. PATENT DOCUMENTS

| | | |
|---|---|---|
| 1,588,556 | 6/1926 | Thompson . |
| 1,967,340 | 7/1934 | Van Splunter ................. 173/324 |
| 2,742,617 | 4/1956 | Bondley ........................ 333/83 |
| 3,422,213 | 1/1969 | Webb ............................. 174/72 |
| 3,979,615 | 9/1976 | Neff ............................... 310/71 |
| 4,037,916 | 7/1977 | Thompson, Jr. ........... 339/258 R |
| 4,442,182 | 4/1984 | Chart ............................ 428/654 |
| 4,544,856 | 10/1985 | King ............................. 310/71 |
| 4,642,497 | 2/1987 | Boyd, Jr. .................... 310/68 R |
| 4,642,885 | 2/1987 | King ............................. 29/596 |
| 4,649,304 | 3/1987 | Atherton et al. ............. 310/71 |
| 4,870,308 | 9/1989 | Sismour, Jr. ................. 310/71 |
| 4,948,996 | 8/1990 | Archibald et al. ............ 310/45 |

FOREIGN PATENT DOCUMENTS

| | | | |
|---|---|---|---|
| 0209032 | 11/1984 | Japan ............ | 310/71 |
| 0881939 | 11/1981 | U.S.S.R. ....... | 310/71 |

Primary Examiner—R. Skudy
Attorney, Agent, or Firm—Nixon & Vanderhye

[57] ABSTRACT

An improved connector for the main field coil of a rotating electric machine having high start/stop cyclic duty capability. The connector is generally L-shaped with the field coil connection portion being parallel to the axis of the machine and the centrifugal forces of the start/stop cycles being applied perpendicular to the field coil connection portion. Enlarged connection portions integral with the L-shaped central region are configured for connection to the field coil and a terminal including a cylindrical post.

37 Claims, 2 Drawing Sheets

MAIN FIELD COIL CONNECTOR WITH HIGH CYCLIC DUTY CAPABILITY

BACKGROUND OF INVENTION

This invention was made with United States Government support under a contract with the United States Navy. The government has certain rights in this invention.

The present invention relates generally to high current electrical connectors, and more specifically to such connectors suitable for use in providing an electrical connection to the main field coil on a generator or motor rotor.

Large electrical motors and generators are used in industrial plants and processes, for generation of electric power, and also for marine or shipboard use. In marine applications they are frequently utilized in the generation of electrical power; and in ships' propulsion systems, that is, in providing the power for driving the ships' propellers. In these and other applications, such large motors and generators are frequently subjected to repeated starts and stops. Failures of such large generators or motors are considered serious matters and reliability of operation is a prime requirement for such machines. Failures can seriously affect operations of industrial plants and power systems, and in the case of marine applications, the ability of the ship to supply necessary power and even the ability to maneuver and maintain headway. As an example of the extreme reliability required for marine applications, customer specifications may require that marine installations meet a cyclic duty requirement of well in excess of fifty thousand starts and stops. Moreover, in order to provide assurance of meeting such stringent requirements, generators and motors have to be designed for reliable start/stop cyclic duty requirements which are well in excess of the required number.

The problem of repeated start/stop cycling of large generators and motors having substantial size and weight results from significant inertial and thermal forces and strains on the various components of such generators and motors. Components at a distance from the axis of the generator or motor are, for example, subjected to significant centrifugal forces in which the restrained components react against the restraint with a force directed away from the center of curvature of its path. This centrifugal force is directly related to the product of the mass of the body and its centripetal acceleration. Such forces are of particular concern in large generators and motors where components are located significant distances from the axis of rotation. Such components include field coils disposed about the rotors and restrained from moving outward away from the generator or motor axis and core by restraining means such as adhesives, coil wedges, and retaining rings and other restraining mechanisms.

Electrical connectors which connect the field coils to terminals for connection, for example, to the field exciter are subjected to various forces, including centrifugal force and forces tending to move the field coils relative to the rotor each time the generator or motor is started or stopped. Concern has arisen tat such connectors are potential weak links in such generators and motors.

One connector designed to withstand repeated start/stop cycles utilizes a leaved structure composed of many thin copper leaves joined together to provide a single piece connector. To provide for limited movement and resist repeated stresses due to the start/stop cycles, its general configuration includes a U-shaped or hairpin bend. The upper jaw of the hairpin is parallel to and connected to, the field coil. The lower jaw includes at its end remote from the apex of the jaws, a perpendicular section, or downwardly extending portion, connected to a terminal which extends through the rotor to the field exciter. This terminal enables connection to an exciter which provides direct current (DC) to power the generator field coil. In such an arrangement, the multiple leaves extend from the field coil parallel to the axis of rotation of the generator and then extend through the hairpin or U-shaped curve to then be bent at substantially a right angle, for connection to the radially extending terminal. The thickness of each jaw about the apex is much less than the width of the jaws to facilitate flexing of the jaws to absorb flexing forces which tend to close the jaws. With such an arrangement, the principal inertial forces generated by start/stop cycles between the coils and the terminal are applied across the jaws of the hairpin to tend to flex the jaws in order to absorb such movements and forces.

Such a connector arrangement has proven effective and reliable in operation for many applications. However, the need for increased reliability, and in particular the ability to withstand increased cycles of start/stop operation, and the need to withstand fatigue failures over such increased cycles, has led to the need for a more reliable connector which will withstand increased start/stop cycles.

OBJECTS AND SUMMARY OF INVENTION

An object of the present invention is to provide an improved main field coil connector for an electric generator or motor with a high start/stop cyclic duty capability.

Another object of the present invention is to provide an improved field connector which will withstand repeated starts and stops of a motor or generator, and which exhibits increased insensitivity to fatigue.

With the aforesaid objects in view, these and other objects of the present invention may be achieved by a unitary main field connector is provided having a substantially L-shaped configuration with a field coil connection portion at one end and a terminal connection portion at the other end of the intermediate connecting portion. The end surfaces of the intermediate connecting portion are at right angles to each other and extend orthogonally a distance substantially greater than the thickness of the intermediate connecting portion, and a slot is positioned in the central region of the intermediate portion and extends perpendicular to the end surfaces of the intermediate connecting portion. More particularly, the field coil connection portion includes an enlarged pad configured for electrical connection to the field coil and extending generally parallel to, and toward the terminal connection portion. The terminal connection portion is enlarged and includes a central bore for brazing the connector to a post of a terminal with a passage provided to allow the escape of the brazing gases. The flexure of the connector during start/stop cycling is applied substantially perpendicular to the surface of the intermediate connection portion adjacent the field coil connection portion.

Figure 1:
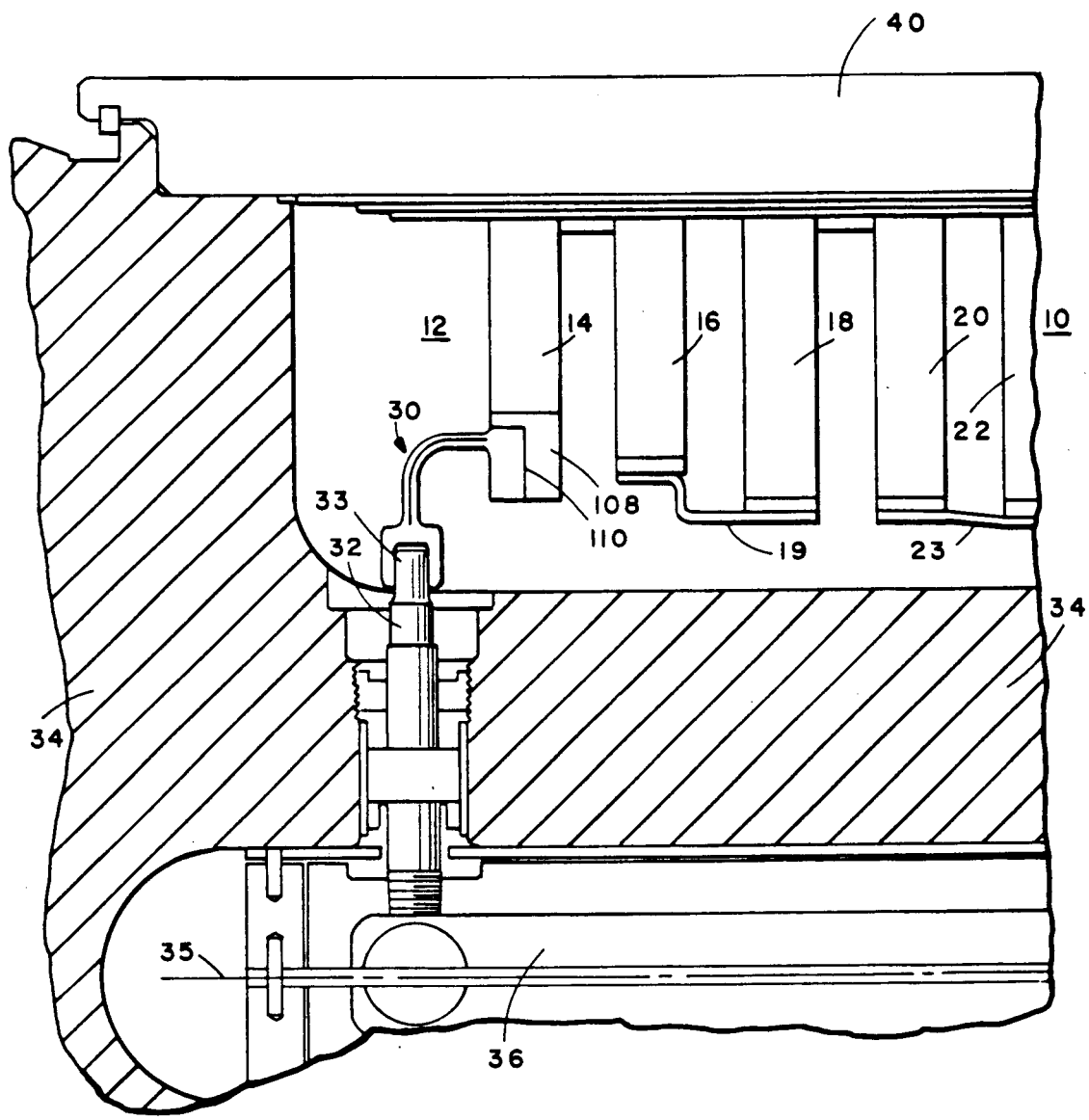
FIG. 1 is a cross sectional view of a portion of a generator incorporating one embodiment of the present invention.

Referring first to FIG. 1. A generator 10, only a portion of which is shown, includes the main field coil 12 including windings or stacks 14, 16, 18, 20 and 22 connected together by connectors such as 19 and 23 and may include field coil pole to pole connectors such as shown in our copending U.S. patent application, Ser. No. 07/453,304 and assigned to the same assignee as the present invention. The field coil 12 is connected through the main field connector 30 to the terminal assembly 32 which passes through the rotor or rotor spindle 34 to connect to the field exciter terminal bar 36. The exciter provides direct current excitation to the generator field through terminal bar 36 as described in copending U.S. patent application Ser. No. 07/312,266, now U.S. patent Ser. No. 4,948,996 of J. Archibald, K. O'Brien, and P. Rasmussen and assigned to the same assignee as the present invention. The retaining ring 40 retains the coils, such as 12, in their respective positions on the rotor 34, and resist outward movement of the coils away from the axis of rotation 35 of the generator 10 upon rotation of the rotor resulting from centrifugal force.

Figure 2:
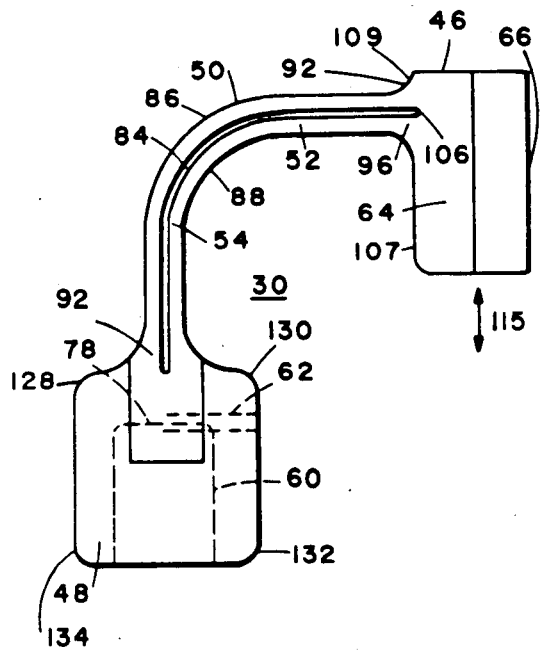
FIG. 2 an enlarged side view of the field coil to terminal connector shown in FIG. 1.

Referring to FIG. 2, the main field connector 30 is a unitary member machined from a single piece of high conductivity oxygen free copper, and includes a field coil end 46, a terminal assembly end 48, and a central connecting portion 50.

The field coil end 46 of the main field connector 30 includes a generally rectangular portion 64 and a rounded tip portion 66 (see FIG. 4), and is offset from the connecting portion 50. That is, as shown in FIG. 2, most of the field coil end 46 is below the connecting portion 50 toward the terminal, assembly end 48.

Figure 3:
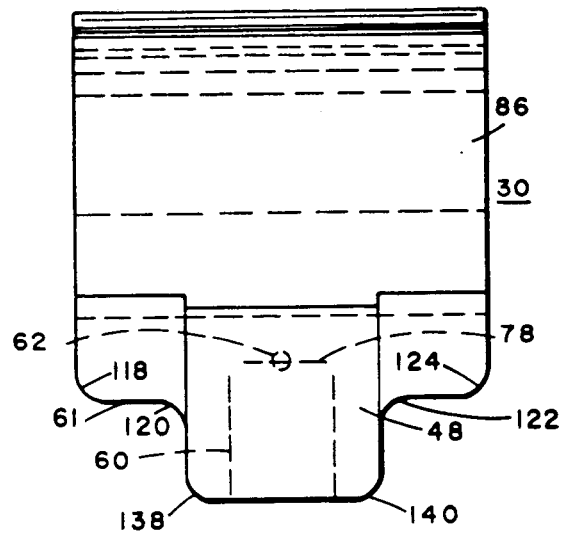
FIG. 3 is a front view of the connector shown in FIG. 1.
Figure 4:
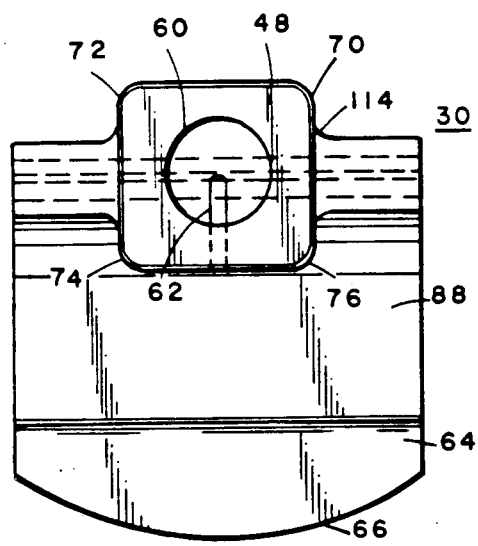
FIG. 4 is a bottom view of FIG. 3.

Referring next to FIGS. 2, 3 and 4, the terminal assembly end 48 is generally rectangular in cross section with rounded edges 70, 72, 74 and 76 and includes a central bore 60 which is adapted to surround and connect to the cylindrical post 33 of the terminal assembly 32 (see FIG. 1). A vent hole 62 extends from the central region of the inner surface of the central bore 60 to provide a passage for gases generated by the brazing process from the central region to outside the main field connector 30 when the terminal assembly end 48 is brazed to cylindrical post 33. In order to insure that the gases of the brazing process can escape through the vent hole 62 even when the main field connector 30 is fully seated on the cylindrical post 33, the vent hole 62 partially extends above the inner surface 78 of central bore 60.

Figure 5:
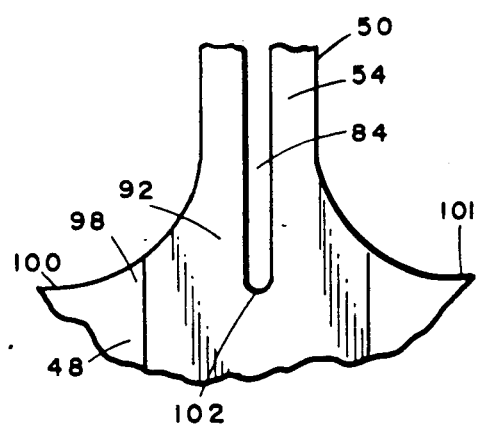
FIG. 5 is an enlarged sectional view of FIG. 2 taken along the angular plane shown by the arrows 5—5.

As best shown in FIGS. 2 and 5, a slot 84 extends along and through the central region of the connecting portion 50 substantially parallel to the outer face 86 and the inner face 88 of the connecting portion. The connecting portion 50 includes first end surface 52 adjacent the field coil end, 46, and second end surface 54 adjacent the terminal assembly end 48 at right angles to each other around an apex, and a slot 84 which is centrally located in the first and second, end surfaces. The slot 84 at the terminal assembly end 48 extends to and through the rounded or flared portion, 92 which joins the connecting portion 50 to the terminal assembly end 48 (as best shown in FIG. 5) to the region defined by a line 98 between the top surfaces 100 and 101 of the terminal assembly end 48. Thus, the slot 84 extends through the connecting portion 50 from side to side in the direction perpendicular to the plane of unitary member 30. A curved portion 102 which extends beyond line 98 results from the action of the cutting tool end of slot 84. Similarly, the slot 84 at its upper end terminates in the region 106 which is in line with the inner surface 107 and 109 of the field coil end 46. As shown by FIGS. 2 and 3, first and second end surfaces, 52 and 54, respectively, extend orthogonally on the order of 90 degrees, relative to one another a linear distance which is significantly more than the thickness of the end surfaces, i.e. the thickness of end surfaces 52 and 54 in the radial and axial directions of the machine, respectively, and the slot 84 similarly extends the same distance through the connecting portion 50 parallel to the first and second end surfaces.

The field coil end of the main field connector 30 is connected to copper member 108 at the end of winding or coil stack 14 through, suitable means such as brazing. The copper member 108 (see FIG. 1) includes an opening 110 which conforms to the shape of the outer surface of the field coil end 46 of the main field connector 30. A rounded or flared portion 96 joins the connecting end 50 of the main field connector 30 to the field coil portion 46 in a manner similar to the rounded or flared portion 92.

Considerable effort has gone into proper dimensioning of the main field connector 30 to provide suitable flexibility, along with the desired resistance to fatigue failures, extremely high reliability and long life. In a preferred embodiment, the thickness of the main field connector 30 shown in FIGS. 3 and 4 is 2.00 inches while the terminal assembly end 48 is 0.94 inches on a side with the rounded edges 70, 72, 74, and 76 having radii of 0.18 inches. The central bore 60 of the terminal assembly end 48 is 0.500 inches in diameter and 0.69 inches deep, while the vent hole 62 is 0.06 inches in diameter and 0.47 inches deep. As shown in FIG. 4, the radii of rounded portions such as 114 connecting the terminal assembly end 48 and the connecting portion 50 are 0.12 inches.

As best shown in FIGS. 2, 3 and 5, the connecting portion 50 has a thickness of 0.15 inches, while the slot 84 is centrally located and is 0.03 inches wide. The radii of the rounded or flared portions 92 are 0.25 inches, and the inner radius of the end of the central portion 50 is 0.51 inches with its center located 1.62 inches above the bottom of the connector. The total height of the main field connector 30 is 2.39 inches while the height of the terminal assembly end 48 is 0.94 inches. The height of the field coil end 46 of the main field connector 30 is 1.00 inches, while the width of the terminal assembly end 48 of the main field connector 30 is 0.94 inches and the width of the field coil end is 0.535 inches.

Still further, the, inner radius of the rounded tip portion 66 of the field coil end 46 (see FIG. 4) of main field connector 30 about the center of the central bore 60 is 1.75 inches, and the overall height of the main field connector (see FIGS. 2 and 3) is 2.39 inches. The height of the surface 61 (see FIG. 3) above the open end of terminal assembly end 48 is 0.43 inches. The distance from a vertical center line of the slot 84 of the connecting portion 50 to the center of the region 106 is 1.215 inches. In order to better resist stress in the flexing and forces applied to the main field connector 30 most of the otherwise sharp edges are rounded, with rounded corners 118, 120, 122 and 124 having radii of 0.18 inches; rounded corners 128, 130, 132 and 134 having radii of 0.12 inches; rounded corners 138 and 140 having radii of 0.12 inches; and the rounded corners at the inner end of central bore 60 having radii of 0.06 inches.

The arrow 115 associated with FIG. 2 shows the general direction of movement of the field coil end 46 of the main field connector 30 through the action of centrifugal force upon rotation of the rotor. It is to be noted that the force and flexure are principally provided against one leg of the generally L-shaped connector. Our analysis and testing indicates that contrary to our previous, and conventional, thinking and beliefs, a multi-layer thin leaved connector of a hairpin configuration being flexed across the jaws of the hairpin cannot be relied upon to give the required very high start/stop cycle duty capability, resistance to fatigue failures, extremely high reliability and long life possible with the present invention.

The present invention thus includes a unitary optimized connector geometry which provides flexure and support for its own weight with extremely little or no fatigue, provides adequate current carrying capacity, eliminates or minimizes stress concentrations, especially at the braze joints, and which provides a very high start/stop cyclic duty capability.

The present invention has been described as applied to a large generator. It is equally applicable to large motors. Also, the dimensions set forth above will vary depending on the geometry of the rotor field windings. Thus, while the present invention has been described with respect to certain preferred embodiments thereof, it is to be understood that numerous variations in the details of construction, the arrangement and combination of parts, and the type of materials used may be made without departing from the spirit and scope of the invention.

What we claim is:

1. In a rotatable electric machine having an axis of rotation and including a field coil positioned on a rotor and a terminal secured to the rotor for providing electrical connection to the field coil, a generally L-shaped field connector for connecting the field coil to the terminal comprising:
    a field coil end adapted to be electrically connected to said field coil;
    a terminal assembly end adapted to be electrically connected to said terminal;
    a central connecting portion between said field coil end and said terminal assembly end;
    said central connecting portion including a first end surface connected to said field coil end, and a second end surface connected to said terminal assembly end, said first and second end surfaces being at substantially right angles to each other;
    said first and second end surfaces extending orthogonally relative to one another with each surface extending substantially linearly a distance significantly greater than the thickness of said end surfaces;
    said first and second end surfaces extending respectively substantially parallel and perpendicular to the axis of said machine when said field connector is connected between said field coil and said terminal; and
    a slot located within said connecting portion and having first and second slot end portions extending substantially parallel to said first and second end surfaces, respectively.

2. The field connector of claim 1 wherein said field coil end includes an enlarged portion for electrical connection to said field coil.

3. The field connector of claim 1 wherein said field coil end is integral with said connecting portion and includes a rounded tip portion having its curvature about an axis which is substantially parallel to said second end surface.

4. The field connector of claim 1 wherein said field coil end is offset from said first end surface such that most of said field coil end extends generally parallel to, and toward, said terminal assembly end.

5. The field connector of claim 1 wherein substantially all of said field coil end extends generally parallel to, and toward, said terminal assembly end.

6. The field connector of claim 1 wherein said central connecting portion is enlarged relative to said thickness of said second end surface and includes a central bore in an end thereof which is adapted to surround a post on said terminal to which it is connected.

7. The field connector of claim 6 wherein said bore and said post are substantially cylindrical.

8. The field connector of claim 6 wherein a vent hole extends from said bore through said central connecting portion providing a passage from said bore to outside said field connector.

9. The field connector of claim 8 wherein said terminal assembly end is brazed to said post, and said vent hole allows gases which may result from the brazing process to escape from said bore.

10. The field connector of claim 1 wherein said slot is positioned within said central connecting portion, said slot being in the order of one fifth the thickness of said central connecting portion, said slot extending through, and substantially parallel to, said central connecting portion.

11. The field connector of claim 10 wherein said slot is substantially centered within, and extends through, said central connecting portion.

12. The field connector of claim 1 wherein said field connector is generally L-shaped and formed of high conductivity copper.

13. The field connector of claim 12 wherein said copper is oxygen free copper.

14. The field connector of claim 1 wherein substantially all corners of said field connector are rounded.

15. The field connector of claim 1 wherein said terminal assembly end includes a cross section which is substantially rectangular with rounded corners, and a central bore which extends in the direction of said central connecting portion adjacent said terminal assembly end.

16. The field connector of claim 1 wherein said slot extends through said connecting portion from side to side thereof in a direction perpendicular to the axis of rotation when said field connector is connected between said field coil and said terminal.

17. The field connector of claim 16 wherein the thicknesses of the material of said connecting portion in said first end surface in a radial direction relative to the axis of rotation and on opposite sides of said first slot end portion are substantially identical one to the other, the thicknesses of the material of said connecting portion in said second end surface in an axial direction relative to the axis of rotation and on opposite sides of said second slot end portion being substantially identical one to the other.

18. In a rotatable electric machine having an axis of rotation and including a field coil positioned on a rotor and a terminal secured to the rotor to provide electrical connection to the field coil, a field connector adapted to provide high start/stop cyclic duty capability comprising:

a substantially L-shaped member including a field coil end and a terminal assembly end joined together by an integral intermediate central connecting portion which includes a bend which is in the order of 90 degrees;

said field coil end including an enlarged surface for connection to said field coil;

said central connecting portion including a first end surface adjacent said field coil end, and a second end surface adjacent said terminal assembly end, each said first end surface and said second end surface having a predetermined thickness;

said first and second end surfaces extending orthogonally relative to one another with each surface extending substantially linearly a distance significantly greater than the thickness of said end surfaces;

said first end surface extending substantially parallel to the axis of said machine when said field connector is connected between said field coil and said terminal such that centrifugal forces of the start/stop cycles are provided through said first end surface in a direction substantially perpendicular to said second end surface; and a slot located within said connecting portion and having first and second slot end portions extending substantially parallel to said first and second end surfaces, respectively.

19. The field connector of claim 18 wherein said slot is substantially centered within said first and second end surfaces, and extends though said central connecting portion.

20. The field connector of claim 18 wherein central said slot is in the order of one fifth the width of said central connecting portion, said slot extending through, and substantially parallel to, said central connecting portion.

21. The field connector of claim 18 wherein said slot is substantially centered within, and extends through, said central connecting portion.

22. The field connector of claim 18 wherein said field coil end extends substantially parallel to said second end surface.

23. The field connector of claim 22 wherein said central connecting portion is enlarged relative to said thickness, of said second end surface and includes a central bore in on end thereof which is adapted to surround a post on said terminal to which it is connected.

24. The field connector of claim 23 wherein said bore and said post are substantially cylindrical.

25. The field connector of claim 23 wherein a vent hole, extends from said bore through said central connecting portion providing a passage from said bore to outside said field connector.

26. The field connector of claim 25 wherein said terminal assembly is brazed to said post, and said vent hole allows gases which may result from the brazing process to escape from said bore.

27. The field connector of claim 18 wherein said field coil end includes a rounded tip portion extending generally parallel to, and toward, said terminal assembly end.

28. The field connector of claim 27 wherein said rounded tip portion is offset from said first end portion such that most of said rounded tip portion extends generally parallel to, and toward, said terminal assembly end.

29. The field connector of claim 27 wherein said rounded tip portion has its curvature about an axis which is substantially parallel to said second end surface.

30. The field connector of claim 18 wherein substantially all corners of said field connector are rounded.

31. The field connector of claim 23 wherein said terminal assembly end includes a cross section which is substantially rectangular with rounded corners, and said bore is centrally located and extends in the direction of said central connecting portion adjacent said terminal assembly end.

32. The field connector of claim 18 wherein said field connector is high conductivity copper.

33. A connector for use in providing an electrical connection to a main field coil of a machine having a rotor, the connector comprising:

a unitary member having a substantially L-shaped configuration defining a plane and having a field coil connecting portion at one end and a terminal assembly connecting portion at the other end; an intermediate connecting portion extending between said field coil connecting end and said terminal assembly connecting end, said intermediate connecting portion formed with an elongated slot substantially coextensive therewith, said slot extending through said connecting portion from side to side in a direction perpendicular to the plane of said unitary member.

34. The connector of claim 33 wherein said field coil connecting portion extends substantially perpendicularly from said intermediate connecting portion in a direction toward said terminal assembly connecting portion.

35. The connector of claim 33 wherein said terminal assembly connecting portion is substantially rectangular in cross-section and is provided with a bore adapted to receive a cylindrical post of an associated terminal assembly.

36. The connector of claim 34 wherein said terminal assembly connecting portion is substantially rectangular in cross-section and is provided with a bore adapted to receive a cylindrical post of an associated terminal assembly.

37. The connector of claim 30 wherein said connector is constructed of high conductivity copper.

* * * * *